United States Patent
Sato

(10) Patent No.: US 9,843,059 B2
(45) Date of Patent: Dec. 12, 2017

(54) FUEL CELL SYSTEM AND METHOD OF CONTROLLING THE SAME

(71) Applicant: NISSAN MOTOR CO., LTD., Yokohama-shi, Kanagawa (JP)

(72) Inventor: Masashi Sato, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/306,539

(22) PCT Filed: Apr. 30, 2014

(86) PCT No.: PCT/JP2014/062028
§ 371 (c)(1),
(2) Date: Oct. 25, 2016

(87) PCT Pub. No.: WO2015/166567
PCT Pub. Date: Nov. 5, 2015

(65) Prior Publication Data
US 2017/0047602 A1 Feb. 16, 2017

(51) Int. Cl.
*H01M 8/04303* (2016.01)
*H01M 8/04* (2016.01)
*H01M 8/04228* (2016.01)
*B60L 11/18* (2006.01)
*H01M 8/04089* (2016.01)
(Continued)

(52) U.S. Cl.
CPC ..... *H01M 8/04303* (2016.02); *B60L 11/1883* (2013.01); *H01M 8/04* (2013.01); *H01M 8/04104* (2013.01); *H01M 8/04228* (2016.02); *H01M 8/04544* (2013.01); *H01M 8/04753* (2013.01); *H01M 8/04798* (2013.01); *H01M 2250/20* (2013.01)

(58) Field of Classification Search
CPC ............... H01M 8/04; H01M 8/04104; H01M 8/04228; H01M 8/04303; H01M 8/04753; H01M 8/04798; H01M 2250/20; B60L 11/1883
See application file for complete search history.

(56) References Cited

U.S. PATENT DOCUMENTS

2011/0293972 A1* 12/2011 Naganuma .......... B60L 11/1887
429/9
2015/0004508 A1 1/2015 Sato et al.

FOREIGN PATENT DOCUMENTS

CA 2 836 555 A1 11/2012
JP 2007-073278 A 3/2007
(Continued)

*Primary Examiner* — Basia Ridley
*Assistant Examiner* — Heng Chan
(74) *Attorney, Agent, or Firm* — Foley & Lardner LLP

(57) ABSTRACT

A fuel cell system for a vehicle with a fuel cell that generates electricity through a supply of anode gas and cathode gas is provided. The fuel cell system includes an idle stop execution unit configured to stop an idling of the fuel cell system according to a vehicle running state, a compressor control unit configured to execute a stop control on a cathode compressor during the idle stop, and an external air introduction control unit configured to restrain an introduction of external air to the fuel cell during the idle stop, wherein the external air introduction control unit is configured to release restraining the introduction of external air according to a voltage in the fuel cell during the idle stop.

9 Claims, 14 Drawing Sheets

(51) Int. Cl.
*H01M 8/04746* (2016.01)
*H01M 8/04791* (2016.01)
*H01M 8/04537* (2016.01)

(56) References Cited

FOREIGN PATENT DOCUMENTS

| | | | |
|---|---|---|---|
| JP | 2011-113859 A | | 6/2011 |
| JP | 2012-134166 A | | 7/2012 |
| JP | 2012134166 A | * | 7/2012 |
| WO | WO 2013-069534 A1 | | 5/2013 |

* cited by examiner

FUEL CELL SYSTEM AND METHOD OF CONTROLLING THE SAME

TECHNICAL FIELD

The present invention relates to a fuel cell system for a vehicle with a fuel cell that generates electricity through a supply of anode gas and cathode gas and a method of controlling the same.

BACKGROUND ART

A fuel cell system for a vehicle executes an idle stop control that stops an idling of a fuel cell system according to a running state of the vehicle. During the idle stop, taking a current from the fuel cell is stopped; therefore, power consumption efficiency in the fuel cell system can be enhanced.

Japanese Patent Application Publication No. 2007-73278 discloses the following fuel cell system. The fuel cell system closes a cathode pressure control valve during an idle stop to prevent anode gas (hydrogen gas) in a dilution device located at a cathode discharge passage from flowing backward to a cathode pole side.

SUMMARY OF INVENTION

In a fuel cell system, considering a smooth recovery from an idle stop to a usual electric generation state, it is preferable that a voltage in a fuel cell during the idle stop be within a predetermined voltage range. During the idle stop, a supply of cathode gas by a cathode compressor is stopped. A reaction of cathode gas remaining in the fuel cell to anode gas transmitted to a cathode pole side consumes the cathode gas, thus gradually reducing the voltage in the fuel cell. Especially, the above-described fuel cell system closes the cathode pressure control valve during the idle stop; therefore, this fuel cell system has a problem that the cathode gas is likely to be insufficient.

An object of the present invention is to provide a fuel cell system that ensures restraining insufficient cathode gas during an idle stop and a method of controlling the fuel cell system.

According to an aspect of this invention, a fuel cell system for a vehicle with a fuel cell that generates electricity through a supply of anode gas and cathode gas is provided. The fuel cell system includes an idle stop execution unit configured to stop an idling of the fuel cell system according to a vehicle running state, a compressor control unit configured to execute a stop control on a cathode compressor during the idle stop, an external air introduction control unit configured to restrain an introduction of external air to the fuel cell during the idle stop, wherein the external air introduction control unit is configured to release restraining the introduction of external air according to a voltage in the fuel cell during the idle stop.

DESCRIPTION OF EMBODIMENTS

The following describes respective embodiments of the present invention with reference to the drawings and a similar description.

First Embodiment

Figure 1:
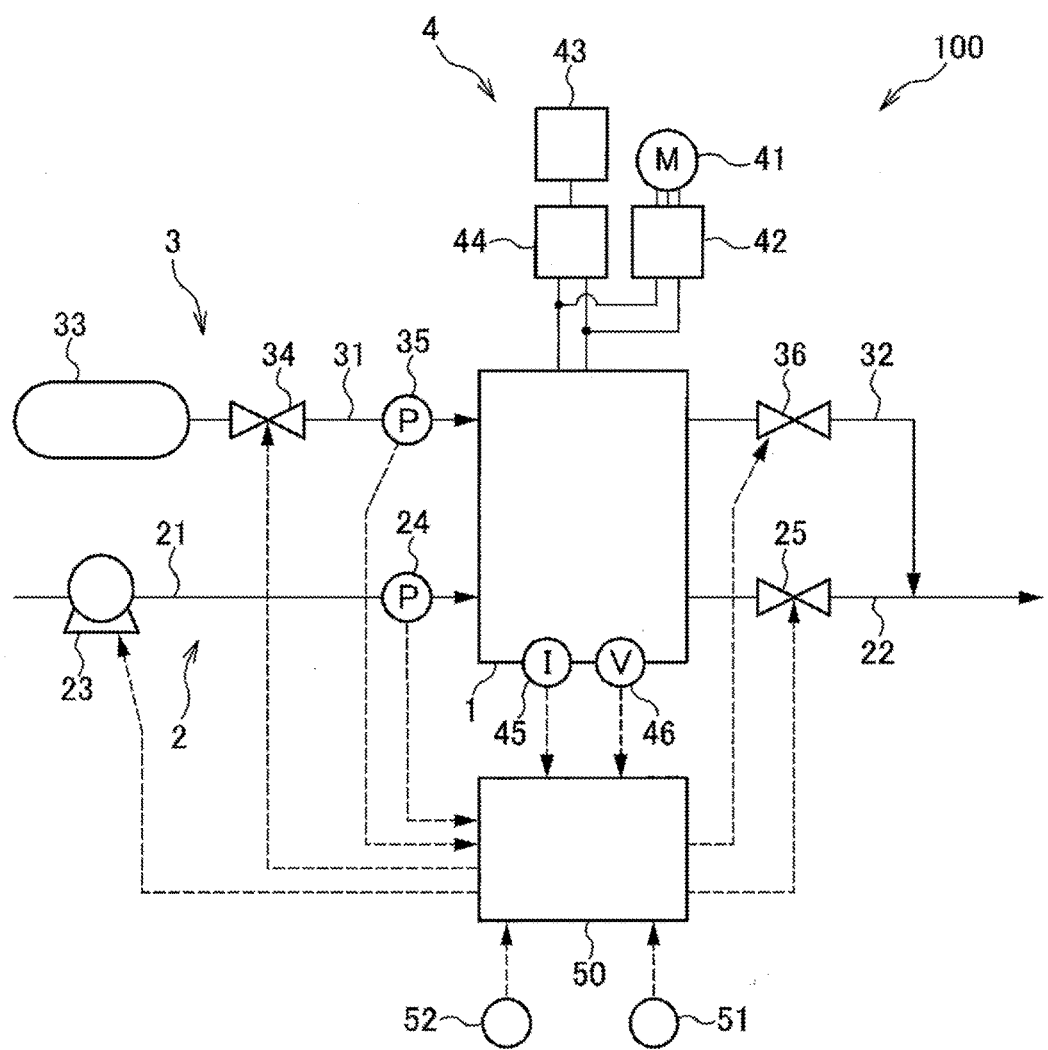
FIG. 1 is a schematic configuration diagram of a fuel cell system according to a first embodiment of the present invention.

The following describes a fuel cell system 100 according to the first embodiment of the present invention with reference to FIG. 1.

The fuel cell system 100 illustrated in FIG. 1 is a fuel cell system mounted to a moving body of a fuel cell vehicle or a similar vehicle. The fuel cell system 100 includes a fuel cell stack 1, a cathode gas supplying/discharging device 2, an anode gas supplying/discharging device 3, an electric power system 4, and a controller 50.

The fuel cell stack 1 is cells configured by stacking a plurality of fuel cells (single cell). The fuel cell stack 1 generates electricity required for a vehicle to run through a supply of anode gas and cathode gas.

The cathode gas supplying/discharging device 2 supplies the fuel cell stack 1 with cathode gas (air) and discharges cathode off-gas discharged from the fuel cell stack 1 to outside. The cathode gas supplying/discharging device 2 includes a cathode gas supply passage 21, a cathode gas discharge passage 22, a cathode compressor 23, a cathode pressure sensor 24, and a cathode pressure control valve 25.

The cathode gas supply passage 21 is a passage into which the cathode gas supplied to the fuel cell stack 1 flows. One end of the cathode gas supply passage 21 is formed as an opening end, and the other end of the cathode gas supply passage 21 is coupled to a cathode gas inlet of the fuel cell stack 1. A distal end opening of the cathode gas supply passage 21 is formed facing a front of the vehicle to have a structure with which external air is easily taken in.

The cathode gas discharge passage 22 is a passage into which the cathode off-gas discharged from the fuel cell stack 1 flows. One end of the cathode gas discharge passage 22 is coupled to a cathode gas outlet of the fuel cell stack 1, and the other end is formed as an opening end. The cathode off-gas is mixed gas containing the cathode gas, water vapor generated by electrode reaction, and a similar component.

The cathode compressor 23 is disposed at a distal end portion of the cathode gas supply passage 21. The cathode compressor 23 takes in air as the cathode gas and supplies the fuel cell stack 1 with the cathode gas. Even if the driving is stopped, the cathode compressor 23 is configured such that the cathode gas can pass through inside the compressor. The controller 50, which will be described later, controls the operation of the cathode compressor 23.

The cathode pressure sensor 24 is disposed at the cathode gas supply passage 21 near the cathode gas inlet of the fuel cell stack 1. The cathode pressure sensor 24 detects a pressure of the cathode gas supplied to the fuel cell stack 1. The cathode gas pressure, which is detected by the cathode pressure sensor 24, represents a pressure of the entire cathode system including a cathode gas flow passage and a similar member of the fuel cell stack 1.

The cathode pressure control valve 25 is disposed at the cathode gas discharge passage 22. The controller 50 controls opening and closing of the cathode pressure control valve 25 to adjust the pressure of the cathode gas supplied to the fuel cell stack 1.

The following describes the anode gas supplying/discharging device 3. The anode gas supplying/discharging device 3 supplies the fuel cell stack 1 with the anode gas (the hydrogen gas) and discharges the anode off-gas discharged from the fuel cell stack 1 to the cathode gas discharge passage 22.

The anode gas supplying/discharging device 3 includes an anode gas supply passage 31, an anode gas discharge passage 32, a high pressure tank 33, an anode pressure control valve 34, an anode pressure sensor 35, and a purge valve 36.

The high pressure tank 33 is a container that maintains and accumulates the anode gas supplied to the fuel cell stack 1 in a high pressure state.

The anode gas supply passage 31 is a passage that supplies the anode gas discharged from the high pressure tank 33 to the fuel cell stack 1. One end of the anode gas supply passage 31 is coupled to the high pressure tank 33, and the other end is coupled to an anode gas inlet of the fuel cell stack 1.

The anode pressure control valve 34 is disposed at the anode gas supply passage 31 downstream with respect to the high pressure tank 33. The controller 50 controls opening and closing of the anode pressure control valve 34 to adjust the pressure of the anode gas supplied to the fuel cell stack 1.

The anode pressure sensor 35 is disposed at the anode gas supply passage 31 near the anode gas inlet of the fuel cell stack 1. The anode pressure sensor 35 detects the pressure of the anode gas supplied to the fuel cell stack 1. The anode gas pressure, which is detected by the anode pressure sensor 35, represents a pressure of the entire anode system including an anode gas flow passage and a similar member of the fuel cell stack 1.

The anode gas discharge passage 32 is a passage that flows the anode off-gas discharged from the fuel cell stack 1. One end of the anode gas discharge passage 32 is coupled to an anode gas outlet of the fuel cell stack 1, and the other end is coupled to the cathode gas discharge passage 22 downstream with respect to the cathode pressure control valve 25.

The purge valve 36 is disposed at the anode gas discharge passage 32. The controller 50 controls opening and closing of the purge valve 36 to control a purge flow rate of the anode off-gas discharged from the anode gas discharge passage 32 to the cathode gas discharge passage 22.

Opening the purge valve 36 and executing the purge control discharges, the anode off-gas to outside through the anode gas discharge passage 32 and the cathode gas discharge passage 22. At this time, the anode off-gas is mixed with the cathode off-gas inside the cathode gas discharge passage 22. Thus, mixing the anode off-gas with the cathode off-gas and discharging the mixture to outside sets a hydrogen concentration in the mixed gas to a value equal to or less than an allowable discharge concentration.

The electric power system 4 includes a running motor 41, an inverter 42, a battery 43, a DC/DC converter 44, a current sensor 45, and a voltage sensor 46.

The running motor 41 is a three-phase AC synchronous motor and is a driving source to drive vehicle wheels. The running motor 41 has a function as an electric motor that rotatably drives through the supply of the electric power from the fuel cell stack 1 and the battery 43 and a function as an electric generator that generates electricity by being rotatably driven by external force.

The inverter 42 is configured of a plurality of semiconductor switches such as an IGBT. The controller 50 switchingly controls the semiconductor switches of the inverter 42. This converts a direct current into an alternating current or converts the alternating current into the direct current. To function the running motor 41 as the electric motor, the inverter 42 converts a resultant current of an output current from the fuel cell stack 1 and an output current from the battery 43 into an three-phase alternating current and supplies the three-phase alternating current to the running motor 41. In contrast to this, to function the running motor 41 as the electric generator, the inverter 42 converts a regenerative alternating current of the running motor 41 into a direct current and supplies the direct current to the battery 43.

The battery 43 charges an extra output power from the fuel cell stack 1 and a regenerative electric power from the running motor 41. The electric power charged to the battery 43 is supplied to an auxiliary machine such as the cathode compressor 23 and the running motor 41 as necessary.

The DC/DC converter 44 is a bidirectional voltage convertor that steps up/down the output voltage from the fuel cell stack 1. Controlling the output voltage from the fuel cell stack 1 by the DC/DC converter 44 adjusts the output current from the fuel cell stack 1 or a similar current.

The current sensor 45 detects the output current taken out from the fuel cell stack 1. The voltage sensor 46 detects the output voltage from the fuel cell stack 1, namely, an inter-terminal voltage of the fuel cell stack 1.

The controller 50 is configured of a microcomputer including a central processing unit (CPU), a read-only memory (ROM), a random access memory (RAM), and an input/output interface (I/O interface).

The controller 50 receives signals from sensors that detect the vehicle operating state such as an accelerator stroke sensor 51, which detects a depression amount of an accelerator pedal, and a vehicle speed sensor 52, which detects a vehicle running speed, in addition to signals from the cathode pressure sensor 24, the anode pressure sensor 35, the current sensor 45, and the voltage sensor 46.

Based on the vehicle running state and the operating state of the fuel cell system 100, the controller 50 calculates a target output power of the fuel cell stack 1. Based on a requested electric power for the running motor 41, a requested electric power for the auxiliary machine, a requested charge and discharge for the battery 43, or a similar request, the controller 50 calculates a target output power. Based on the target output power, the controller 50 refers to current-voltage characteristics of the predetermined fuel cell stack 1 to calculate a target output current of the fuel cell stack 1. Using the DC/DC converter 44, the controller 50 controls the voltage in the fuel cell stack 1 such that the output current from the fuel cell stack 1 becomes the target output current.

For example, like during a low-load running, when the requested electric power for the fuel cell stack 1 is low, the controller 50 (an idle stop execution unit) executes a so-called idle stop control that temporarily stops the electric generation by the fuel cell stack 1 and drives the running motor 41, the auxiliary machine, and a similar machine only by the electric power from the battery 43. If the requested electric power increases due to an acceleration request or a similar request or an amount of charge by the battery 43 falls below a predetermined threshold during the idle stop, the controller 50 terminates the idle stop and resumes the electric generation by the fuel cell stack 1.

Figure 2:
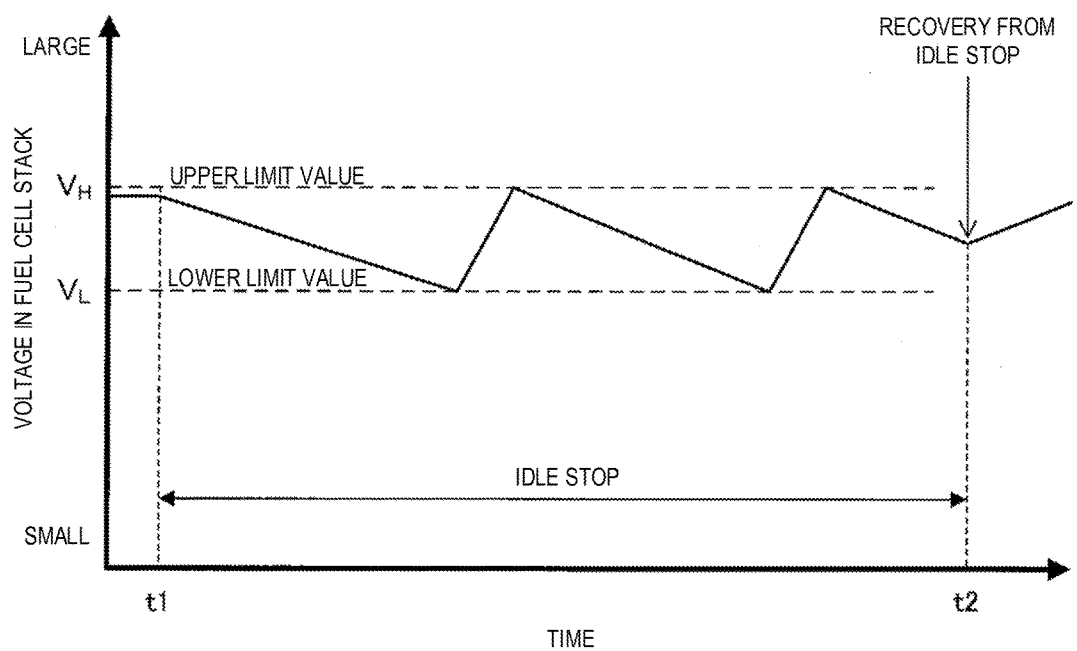
FIG. 2 is an explanatory view of a voltage control of a fuel cell stack during an idle stop.

With reference to FIG. 2, the following describes a voltage control of the fuel cell stack 1 during the idle stop.

The driving of the cathode compressor 23 is basically stopped during the idle stop. A reaction of the cathode gas remaining in the fuel cell stack 1 to the anode gas (the hydrogen gas) transmitted to the cathode pole side consumes the cathode gas, thus gradually reducing the voltage in the fuel cell stack 1. If a duration of the idle stop lengthens and causes an excessively low voltage in the fuel cell stack 1, this takes time until the voltage in the fuel cell stack 1 recovers up to a requested voltage value after the recovery from the idle stop, increasing a response delay to the acceleration request or a similar request.

Accordingly, as illustrated in FIG. 2, the fuel cell system 100 that executes the idle stop manages the voltage in the fuel cell stack 1 during the idle stop so as to be in a range between preset lower limit value $V_L$ and upper limit value $V_H$. The upper limit value $V_H$ is set to a value that can avoid deterioration due to high potential.

As illustrated in FIG. 2, if the voltage in the fuel cell stack 1 reduces up to the lower limit value $V_L$ during the idle stop, the fuel cell system 100 supplies the fuel cell stack 1 with the cathode gas until this voltage becomes the upper limit value $V_H$. The fuel cell system 100 has a feature in a cathode gas supply control during the idle stop and supplies the cathode gas using environmental wind, running air, or similar air.

Figure 3:
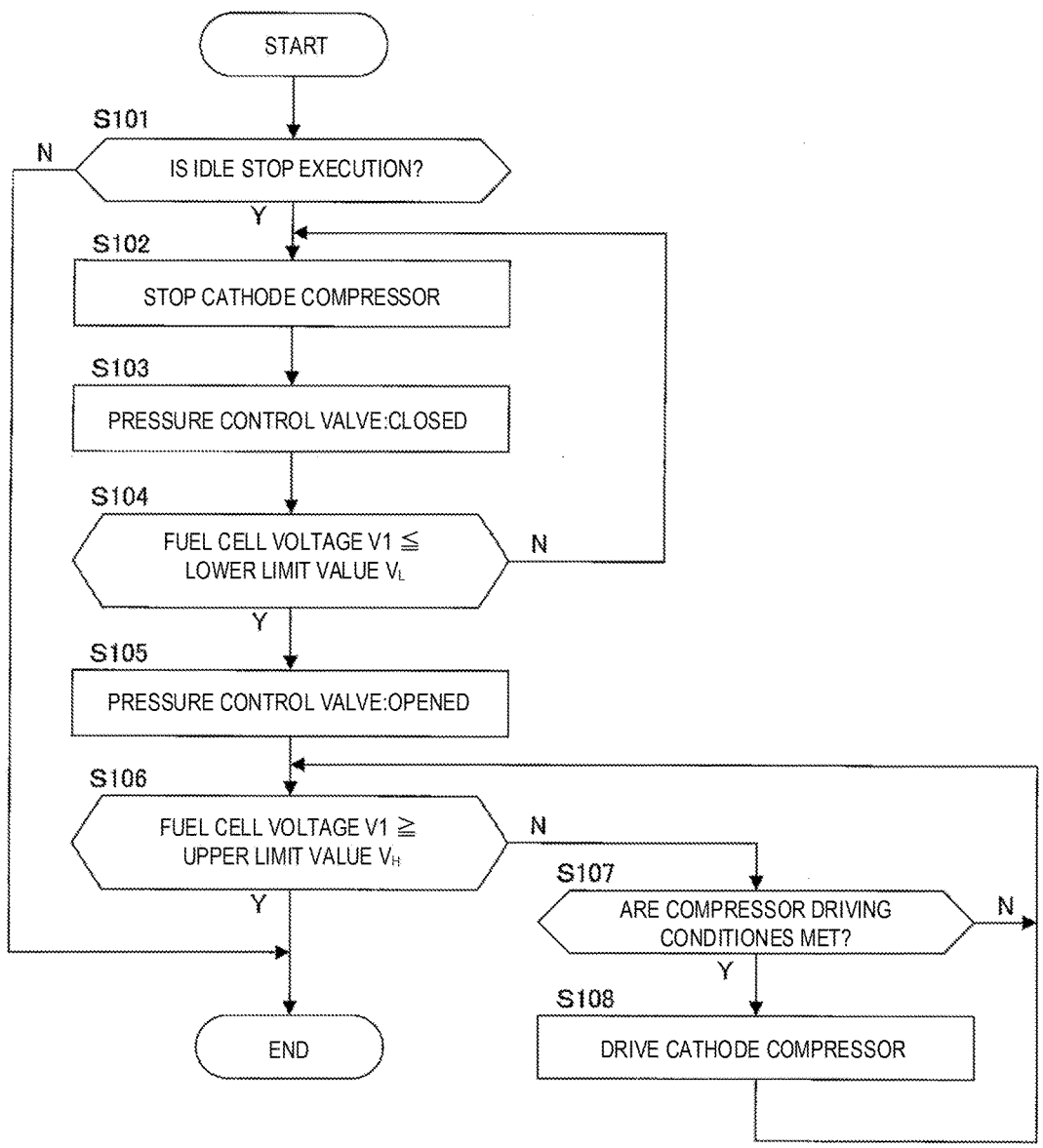
FIG. 3 is a flowchart showing a cathode supply control during idle stop executed by a controller of the fuel cell system according to the first embodiment.

The following describes the cathode supply control during idle stop executed by the controller 50 with reference to FIG. 3. FIG. 3 is a flowchart showing the cathode supply control during idle stop executed by the controller 50. The cathode supply control during idle stop is repeatedly executed during the idle stop of the fuel cell system 100.

At S101, the controller 50 determines whether the idle stop control is in execution in the fuel cell system 100 or not. For example, the controller 50 refers to a flag regarding the idle stop control and determines whether the idle stop control is in execution or not based on the flag.

The idle stop control is executed when the requested electric power for the fuel cell stack 1 is low, for example, like during the low load running. That is, when a requested load to the fuel cell stack 1 is a reference value or less, the anode gas pressure and the cathode gas pressure are within the predetermined pressure ranges, and a temperature of cooling water cooling the fuel cell stack 1 is within a predetermined temperature range, the controller 50 determines that idle stop conditions are met and executes the idle stop control. When a driver makes the acceleration request or a similar request, the controller 50 cancels the execution of the cathode supply control during idle stop or a similar control, recovers from the idle stop control, and resumes a usual electric generation control.

When the controller 50 (a compressor control unit) determines that the idle stop is not in execution at S101, the controller 50 terminates the cathode supply control during idle stop. In contrast to this, when the controller 50 determines that the idle stop is in execution at S101, the controller 50 executes a process at S102.

At S102, the controller 50 (an external air introduction control unit) stops driving the cathode compressor 23. Afterwards, at S103, the controller 50 controls the cathode pressure control valve 25 so as to be in a fully-closed state. Thus closing the cathode pressure control valve 25 ensures preventing unnecessary supply of external air such as running air to the fuel cell stack 1 while the cathode compressor 23 stops. During the idle stop, the purge valve 36 is closed and an opening degree of the anode pressure control valve 34 is controlled such that the anode gas pressure becomes the predetermined pressure.

At S104, the controller 50 determines whether a voltage V1 in the fuel cell stack 1 during the idle stop is the lower limit value $V_L$ or less or not. The voltage V1 in the fuel cell stack 1 is calculated based on the detection signal by the voltage sensor 46. The voltage V1 in the fuel cell stack 1 is the inter-terminal voltage in the fuel cell stack 1; however, the voltage V1 may be an average voltage value calculated based on a voltage in each single cell, which constitutes the fuel cell stack 1, or a similar value.

When the voltage V1 in the fuel cell stack 1 is larger than the lower limit value $V_L$, the controller 50 repeatedly executes the processes at S102 to S104 until the cathode gas in the fuel cell stack 1 is consumed and the voltage V1 reaches the lower limit value $V_L$.

In contrast to this, when the voltage V1 in the fuel cell stack 1 is the lower limit value $V_L$ or less, the controller 50 determines that the voltage in the fuel cell stack 1 needs to be recovered to restrain the response delay of the output voltage from the fuel cell stack 1 at the recovery from the idle stop and executes a process at S105.

At S105, the controller 50 controls the cathode pressure control valve 25 to be a fully-opened state from the fully-closed state. Thus, even if the cathode compressor 23 is in stop, opening the cathode pressure control valve 25 during the idle stop supplies the environmental wind generated around the vehicle and the running air during the vehicle running to the fuel cell stack 1 through the cathode compressor 23 and the cathode gas supply passage 21. As described at S103 and S105, the cathode pressure control valve 25 has a function to control the introduction state of the external air to the fuel cell stack 1 during the idle stop.

At S106, the controller 50 determines whether the voltage V1 in the fuel cell stack 1 is the upper limit value $V_H$ or more or not.

When the voltage V1 in the fuel cell stack 1 is the upper limit value $V_H$ or more, the controller 50 terminates the cathode supply control during idle stop at this time. Afterwards, the controller 50 starts the cathode supply control during idle stop again and executes the process at S101.

In contrast to this, when the voltage V1 in the fuel cell stack 1 is smaller than the upper limit value $V_H$, the controller 50 determines that the voltage in the fuel cell stack 1 has not yet recovered and executes a process at S107.

At S107, the controller 50 determines whether compressor driving conditions are met or not. When a predetermined period elapses after the cathode pressure control valve 25 is opened at S105 and the voltage V1 in the fuel cell stack 1 reduces up to a second lower limit value $V_{L2}$, which is set lower than the lower limit value $V_L$, after the cathode pressure control valve 25 is opened, the controller 50 determines that the compressor driving conditions are met.

When the controller 50 determines that the compressor driving conditions are not met at S107, the controller 50 executes the process at S106 again. In contrast to this, when the controller 50 determines that the compressor driving conditions are met at S107, the controller 50 executes a process at S108.

At S108, the controller 50 drives the cathode compressor 23 and forcibly supplies the external air to the fuel cell stack 1. After the process at S108, the controller 50 executes the process at S106 again. Thus, when the compressor driving conditions are met, the cathode compressor 23 is driven, and the cathode gas is kept to be supplied until the voltage V1 in the fuel cell stack 1 reaches the upper limit value $V_H$.

The execution of the cathode supply control during idle stop in the fuel cell system 100 manages the voltage V1 in the fuel cell stack 1 during the idle stop in a range between the lower limit value $V_L$ and the upper limit value $V_H$ as illustrated in FIG. 2.

Figure 4:
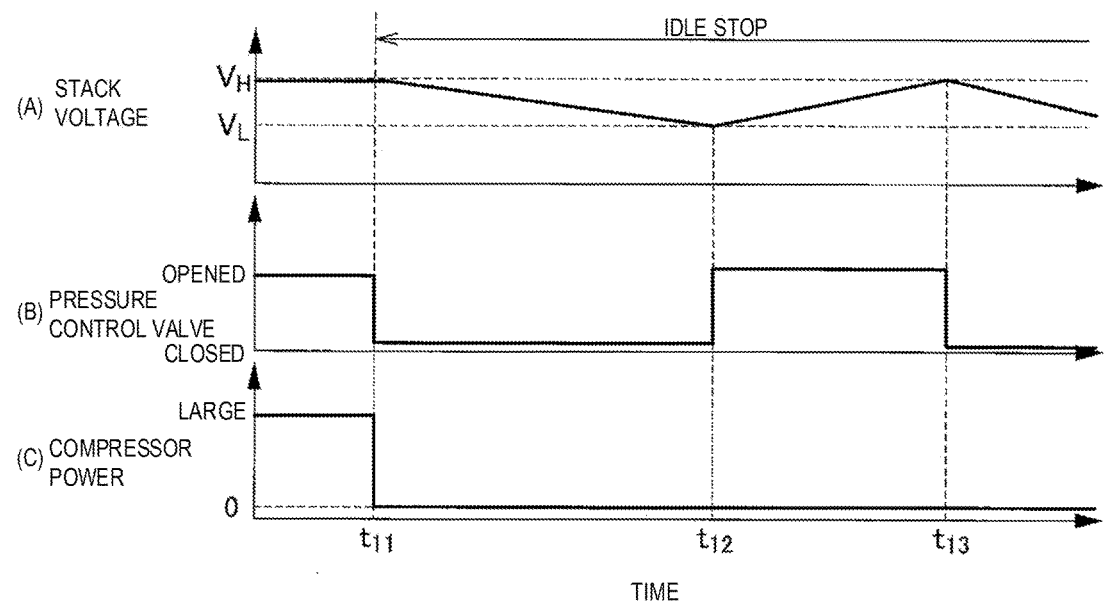
FIG. 4 is a timing chart describing an idle stop cathode control when a cathode pressure control valve is opened to introduce external air.
Figure 5:
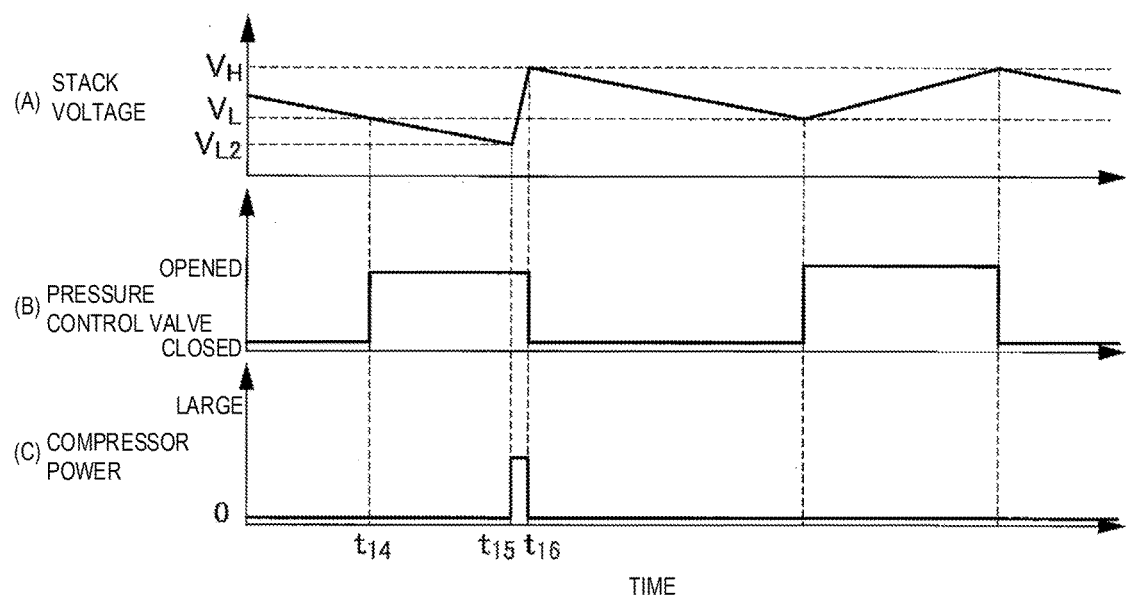
FIG. 5 is a timing chart describing the idle stop cathode control when a cathode compressor is driven to forcibly introduce the external air.

The following describes operational effects of the cathode supply control during idle stop with reference to FIG. 4 and FIG. 5. FIG. 4 illustrates an example of opening the cathode pressure control valve 25 to introduce the external air and is a timing chart related to the processes at S105 and S106 in FIG. 3. FIG. 5 illustrates an example of driving the cathode compressor 23 to forcibly introduce the external air and is a timing chart related to the processes at S105 to S108 in FIG. 3.

As illustrated in FIG. 4, when idle stop conditions are met at a time $t_{11}$, the fuel cell system 100 executes the idle stop control and the cathode supply control during idle stop. The electric power supply to the cathode compressor 23 is stopped at the time $t_{11}$ as illustrated in FIG. 4(C), and the cathode pressure control valve 25 is closed as illustrated in FIG. 4(B). Thus closing the cathode pressure control valve 25 restrains the introduction of the external air (the running air or similar air) to the fuel cell stack 1. Accordingly, the reaction of the cathode gas remaining in the fuel cell stack 1 to the anode gas transmitted to the cathode pole side consumes the cathode gas, thus gradually reducing the voltage in the fuel cell stack 1 as illustrated in FIG. 4(A).

When the voltage in the fuel cell stack 1 reduces up to the lower limit value $V_L$ at a time $t_{12}$, as illustrated in S105 in FIG. 3 and FIG. 4(B), the cathode pressure control valve 25 is controlled from the fully-closed state to the fully-opened state. Thus, even if the cathode compressor 23 is in stop, opening the cathode pressure control valve 25 supplies the environmental wind generated around the vehicle and the running air during the vehicle running to the fuel cell stack 1 through the cathode compressor 23 and the cathode gas supply passage 21. Even if the cathode compressor 23 does not forcibly introduce the external air, the external air such as the running air is introduced. Accordingly, as illustrated in FIG. 4(A), the voltage in the fuel cell stack 1 gradually increases.

When the voltage in the fuel cell stack 1 reaches the upper limit value $V_H$ at a time $t_{13}$, the cathode pressure control valve 25 is closed. Afterwards, until the voltage in the fuel cell stack 1 reaches the lower limit value $V_L$ or the idle stop control ends, the cathode pressure control valve 25 is maintained in the fully-closed state.

As described above, if the voltage in the fuel cell stack 1 reduces up to the lower limit value $V_L$ during the idle stop, with the fuel cell system 100, opening the cathode pressure control valve 25 can supply the fuel cell stack 1 with the external air such as the running air as the cathode gas without driving the cathode compressor 23.

The following describes the case where the cathode compressor 23 is driven during the idle stop to forcibly introduce the external air with reference to FIG. 5.

As illustrated in FIG. 5, when the voltage in the fuel cell stack 1 reduces up to the lower limit value $V_L$ at a time $t_{14}$ during the idle stop, as illustrated in S105 in FIG. 3 and FIG. 5(B), the cathode pressure control valve 25 is controlled to be the fully-opened state from the fully-closed state. This allows the external air such as the running air to be supplied to the fuel cell stack 1. However, the following possibly occurs. If the environmental wind generated around the vehicle or the running air during the vehicle running is weak, opening the cathode pressure control valve 25 cannot make up insufficient cathode gas, failing to recover the voltage in the fuel cell stack 1.

When opening the cathode pressure control valve 25 does not recover the voltage in the fuel cell stack 1 and the voltage in the fuel cell stack 1 reduces up to the second lower limit value $V_{L2}$ at, for example, a time $t_{15}$, the controller 50 determines that the compressor driving conditions are met and as illustrated in FIG. 5(C), the electric power is supplied to the cathode compressor 23. This drives the cathode compressor 23 and the external air is forcibly supplied to the fuel cell stack 1. Consequently, as illustrated in FIG. 5(A), the voltage in the fuel cell stack 1 increases. When the voltage in the fuel cell stack 1 does not reach the upper limit value even after the elapse of a predetermined period after the cathode pressure control valve 25 is opened, the controller 50 may determine that the compressor driving conditions are met and the cathode compressor 23 may be driven.

When the voltage in the fuel cell stack 1 reaches the upper limit value $V_H$ at a time $t_{16}$, the cathode compressor 23 is stopped and immediately after that, the cathode pressure control valve 25 is closed. Afterwards, until the voltage in the fuel cell stack 1 reaches the lower limit value $V_L$ or the idle stop control ends, the cathode pressure control valve 25 is maintained in the fully-closed state.

As described above, with the fuel cell system 100, when opening the cathode pressure control valve 25 during the idle stop does not recover the voltage in the fuel cell stack 1 and therefore the predetermined compressor driving conditions are met, the cathode compressor 23 is driven. Accordingly, even with the weak running air or similar air, the cathode gas can be reliably supplied to the fuel cell stack 1. Thus supplying the external air ensures solving the insufficient cathode gas during the idle stop, thereby ensuring managing the voltage in the fuel cell stack 1 in a range between the lower limit value $V_L$ and the upper limit value $V_H$.

With the fuel cell system 100 according to the above-described embodiment ensures obtaining the following effects.

With the fuel cell system 100, the controller 50 executes a stop control on the cathode compressor during the idle stop. At this time, closing the cathode pressure control valve 25 located at the cathode gas discharge passage 22 ensures restraining the introduction of the external air such as the running air to the fuel cell stack 1. The controller 50 executes a valve open control on the cathode pressure control valve 25 according to the voltage in the fuel cell stack 1 during the idle stop to release restraining the introduction of external air. More specifically, when the voltage in the fuel cell stack 1 during the idle stop reaches the lower limit value $V_L$, the cathode pressure control valve 25 is opened.

Releasing restraining the introduction of external air by the cathode pressure control valve 25 during the idle stop ensures supplying the external air such as the running air as the cathode gas to the fuel cell stack 1 without driving the cathode compressor 23. When the idle stop is executed during the vehicle stop, the environmental wind around the vehicle can be supplied to the fuel cell stack 1 as the cathode gas. Thus, with the fuel cell system 100, releasing restraining the introduction of external air causes the external air to flow from the cathode gas supply passage 21 into the fuel cell stack 1. Accordingly, taking in the running air and the environmental wind as the cathode gas ensures solving the insufficient cathode gas during the idle stop. Since the cathode gas is supplied without driving the cathode compressor 23, this allows saving a power consumption in the cathode compressor 23, thereby allowing enhancing the power consumption efficiency in the fuel cell system 100.

Furthermore, when the cathode pressure control valve 25 is opened and the voltage in the fuel cell stack 1 reaches the upper limit value $V_H$, the controller 50 in the fuel cell system 100 closes the cathode pressure control valve 25 again. This ensures restraining the introduction of unnecessary external air, ensuring preventing the voltage in the fuel cell stack 1 from exceeding the upper limit value $V_H$ during the idle stop. Accordingly, the fuel cell system 100 ensures managing the voltage in the fuel cell stack 1 in a range between the lower limit value $V_L$ and the upper limit value $V_H$ during the idle stop.

Furthermore, when the voltage in the fuel cell stack 1 does not recover after the cathode pressure control valve 25 is opened during the idle stop, the controller 50 in the fuel cell system 100 drives the cathode compressor 23 until the voltage in the fuel cell stack 1 reaches the upper limit value. Thus driving the cathode compressor 23 can forcibly supply the cathode gas to the fuel cell stack 1 even if the running air or similar air is weak, this allows reliably solving the insufficient cathode gas during the idle stop.

Second Embodiment

Figure 6:
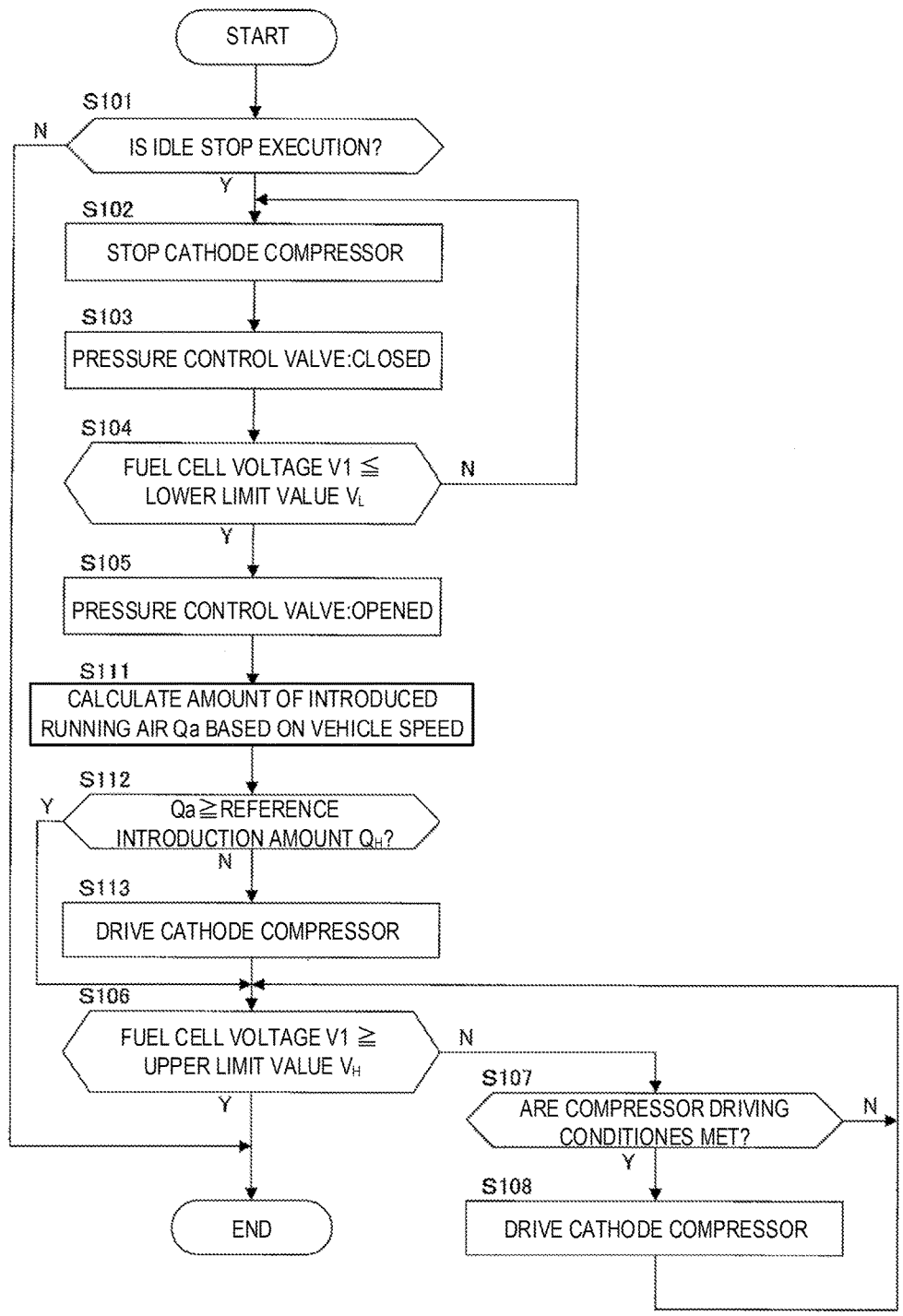
FIG. 6 is a flowchart showing the cathode supply control during idle stop executed by the controller of a fuel cell system according to a second embodiment.

With reference to FIG. 6, the following describes the fuel cell system 100 according to the second embodiment of the present invention. The following embodiments use identical reference numerals to components or similar members that have functions identical to those of the first embodiment, and therefore such elements may not be further elaborated here.

FIG. 6 is a flowchart showing the cathode supply control during idle stop executed by the controller 50 in the fuel cell system 100 according to the second embodiment.

As illustrated in FIG. 6, the controller 50 in the fuel cell system 100 according to the second embodiment differs from the controller in the fuel cell system according to the first embodiment in that the controller 50 executes a driving determination of the cathode compressor 23 based on an amount of introduced running air after the process at S105. That is, the controller 50 in the fuel cell system 100 according to the second embodiment executes processes at S111 to S113 after the process at S105.

As illustrated in FIG. 6, when the controller 50 determines that the voltage V1 in the fuel cell stack 1 reduces up to the lower limit value $V_L$ at S104, the controller 50 executes the valve open control on the cathode pressure control valve 25 such that the running air or similar air is introduced inside the fuel cell stack 1 at S105. Afterwards, the controller 50 executes a process at S111.

At S111, the controller 50 (an amount-of-introduced-external-air calculator) calculates an amount of introduced running air Qa based on a current vehicle speed detected by the vehicle speed sensor 52. The amount of introduced running air Qa is a flow rate of the external air such as the running air (the cathode gas) introduced to the fuel cell stack 1 and is calculated as a larger value as the vehicle speed increases. The amount of introduced running air Qa may be corrected according to an atmospheric pressure or a similar factor.

At S112, the controller 50 determines whether the amount of introduced running air Qa, which is calculated at S111, is a reference introduction amount $Q_H$ or more or not. The reference introduction amount $Q_H$ is set as a value that can increase the voltage in the fuel cell stack 1 by the introduction of the running air or similar air.

When the amount of introduced running air Qa is the reference introduction amount $Q_H$ or more, the controller 50 determines that a sufficient amount of external air can be taken in without driving the cathode compressor 23 and executes the process at S106 without the execution of the process at S113.

In contrast to this, when the amount of introduced running air Qa is smaller than the reference introduction amount $Q_H$, the controller 50 determines that the sufficient amount of external air cannot be taken in only by opening the cathode pressure control valve 25 and executes a process at S113.

At S113, the controller 50 drives the cathode compressor 23 to forcibly supply the external air to the fuel cell stack 1. After the process at S113, the controller 50 executes the process at S106.

As described above, when the amount of introduced running air Qa is the reference introduction amount $Q_H$ or more in the fuel cell system 100, the cathode compressor 23 is not driven. However, when it is difficult to take in the running air or similar air due to some sort of influence, even if the amount of introduced running air Qa is the reference introduction amount $Q_H$ or more, there may be a possibility that only opening the cathode pressure control valve 25 fails to supply the sufficient external air to the fuel cell stack 1. Even in such case, since the controller 50 drives the cathode compressor 23 when the compressor driving conditions are met (see S107 and S108), this allows reliably supplies the cathode gas to the fuel cell stack 1. Thus, S107 and S108 function as a sort of a fail-safe process.

Figure 7:
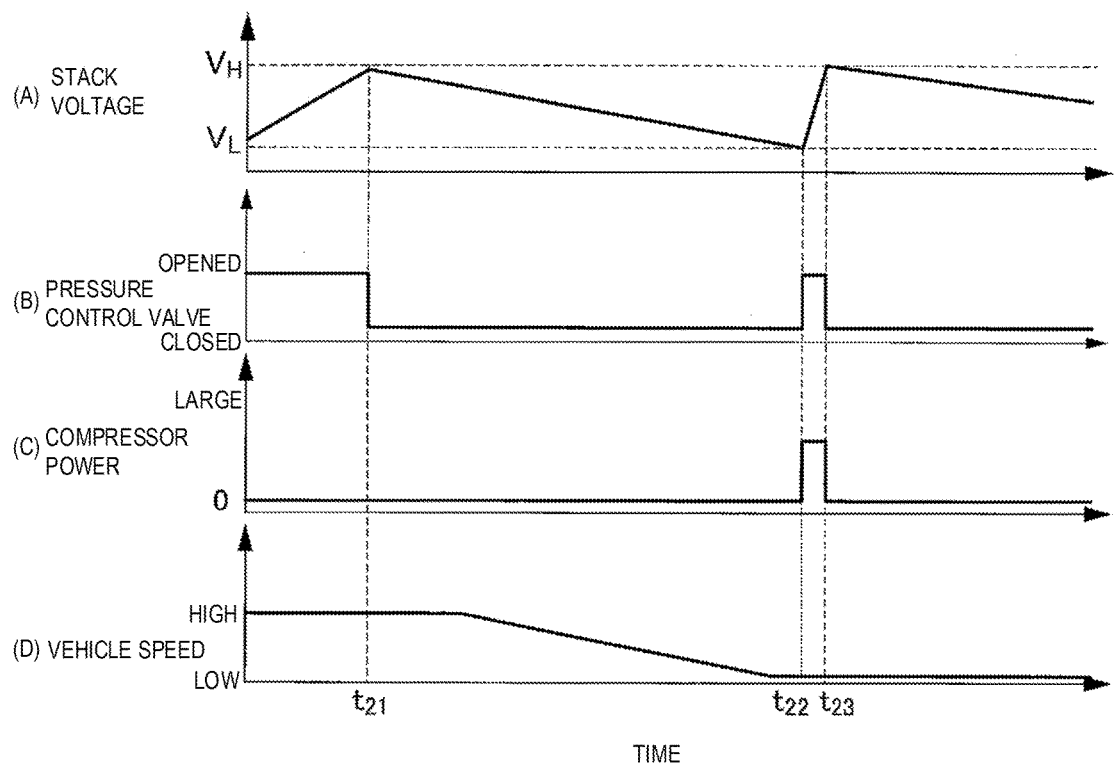
FIG. 7 is a timing chart describing the cathode supply control during idle stop according to the second embodiment.

With reference to FIG. 7, the following describes operational effects of the cathode supply control during idle stop executed by the controller 50 in the fuel cell system 100 according to a second embodiment.

When the voltage in the fuel cell stack 1 reduces up to the lower limit value $V_L$ during the idle stop, the controller 50 executes the valve open control on the cathode pressure control valve 25. While the vehicle runs at a high speed as illustrated in FIG. 7(D), as illustrated in FIG. 7(B), only opening the cathode pressure control valve 25 can take in the sufficient amount of external air, increasing the voltage in the fuel cell stack 1 to the upper limit value $V_H$. When the voltage in the fuel cell stack 1 reaches the upper limit value $V_H$ at a time $t_{21}$, the cathode pressure control valve 25 is closed.

Afterwards, when the voltage in the fuel cell stack 1 reduces up to the lower limit value $V_L$ at a time $t_{22}$, the cathode pressure control valve 25 is opened again. At this time, since the vehicle runs at a low speed as illustrated in FIG. 7(D), the amount of introduced running air Qa becomes smaller than the reference introduction amount $Q_H$. In this case, only opening the cathode pressure control valve 25 fails to take in the sufficient amount of external air; therefore, as illustrated in FIG. 7(C), the electric power is supplied to the cathode compressor 23. This drives the cathode compressor 23 to forcibly supply the external air to the fuel cell stack 1. Consequently, as illustrated in FIG. 7(A), the voltage in the fuel cell stack 1 increases to the upper limit value $V_H$.

With the fuel cell system 100 according to the above-described embodiment, the following effects can be obtained.

With the fuel cell system 100, when the voltage in the fuel cell stack 1 reduces up to the lower limit value $V_L$ during the idle stop, the controller 50 executes the valve open control on the cathode pressure control valve 25. The controller 50 calculates the amount of introduced running air Qa suppliable to the fuel cell stack 1 based on the vehicle speed. When the amount of introduced running air Qa is smaller than the reference introduction amount $Q_H$, the controller 50 drives the cathode compressor 23 until the voltage in the fuel cell stack 1 reaches the upper limit value.

Even if the vehicle runs at a low speed and only opening the cathode pressure control valve 25 fails to take in the sufficient amount of external air, thus driving the cathode compressor 23 allows forcibly supplying the cathode gas (the external air) to the fuel cell stack 1. Accordingly, this ensures reliably solving the insufficient cathode gas during the idle stop. Since the cathode compressor 23 is driven only when necessary according to the amount of introduced running air Qa, this allows saving the power consumption in the cathode compressor 23, thereby ensuring enhancing the power consumption efficiency in the fuel cell system 100.

Since the fuel cell system 100 executes the driving determination on the cathode compressor 23 based on the introduced running air amount Qa, which is calculated from the vehicle speed, this allows an instant determination on necessity of driving the cathode compressor 23, allowing a quick recovery of the voltage in the fuel cell stack 1.

The above-described fuel cell system 100 according to the first and the second embodiments includes the cathode pressure control valve 25 at the cathode gas discharge passage 22. The cathode pressure control valve 25 executes the external air introduction control during the idle stop. However, as a configuration of achieving the external air introduction control during the idle stop, in addition to the configuration of disposing the cathode pressure control valve 25 at the cathode gas discharge passage 22, configurations illustrated in FIG. 8A to FIG. 8D are possible.

FIG. 8A to FIG. 8D each illustrate the fuel cell system 100 according to one modification.

Figure 8A:
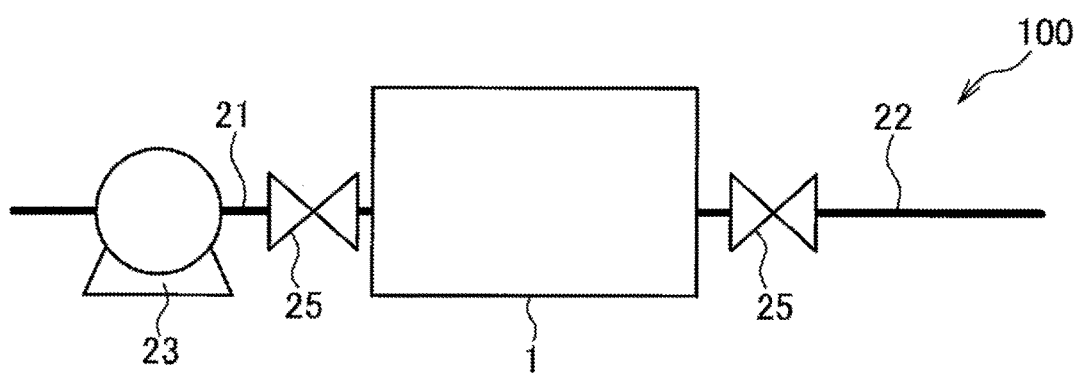
FIG. 8A illustrates a fuel cell system according to one modification.

As illustrated in FIG. 8A, the fuel cell system 100 may include the cathode pressure control valves 25 at the respective cathode gas supply passage 21 and cathode gas discharge passage 22. In this configuration, the valve close control is simultaneously executed on these two cathode pressure control valves 25 at S103 in FIG. 3 and FIG. 6 and the valve open control is simultaneously executed at S106 in FIG. 3 and FIG. 6.

Figure 8B:
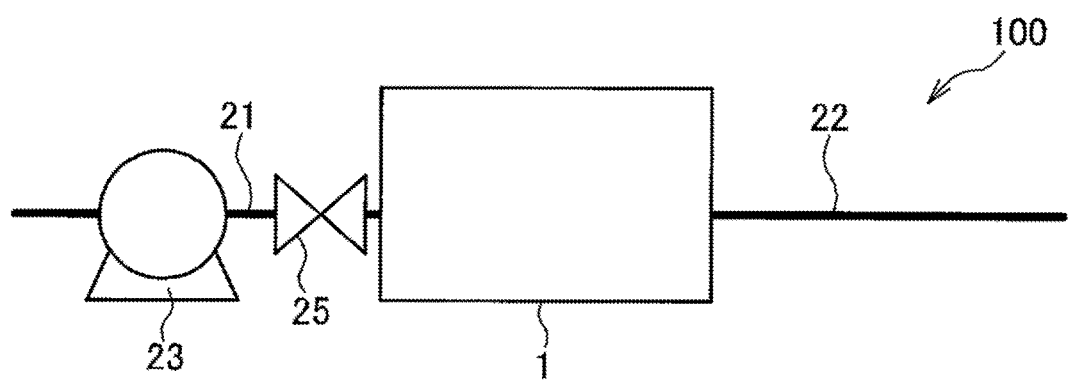
FIG. 8B illustrates a fuel cell system according to one modification.

As illustrated in FIG. 8B, the fuel cell system 100 may include the cathode pressure control valve 25 between the cathode compressor 23 and the fuel cell stack 1 at the cathode gas supply passage 21.

Figure 8C:
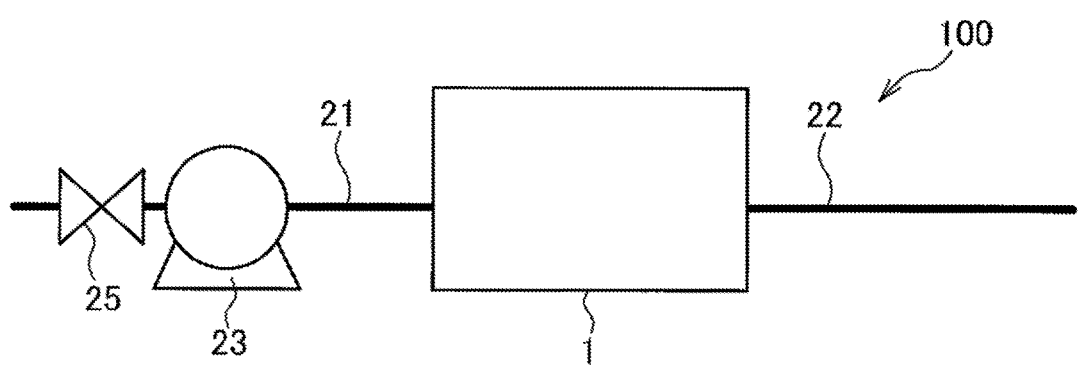
FIG. 8C illustrates a fuel cell system according to one modification.

Further, as illustrated in FIG. 8C, the fuel cell system 100 may include the cathode pressure control valve 25 at the cathode gas supply passage 21 upstream with respect to the cathode compressor 23. As a configuration that opens and closes the cathode gas supply passage 21 upstream with respect to the cathode compressor 23, a configuration that opens and closes an opening on a forward front grille of a vehicle by a shutter is also possible. In this case, an upstream end of the cathode gas supply passage 21 is disposed opposed to the opening of the forward front grille, and the shutter is disposed to open and close this opening. In this configuration, the shutter is closed at S103 in FIG. 3 and FIG. 6 and is opened at S106 in FIG. 3 and FIG. 6.

Figure 8D:
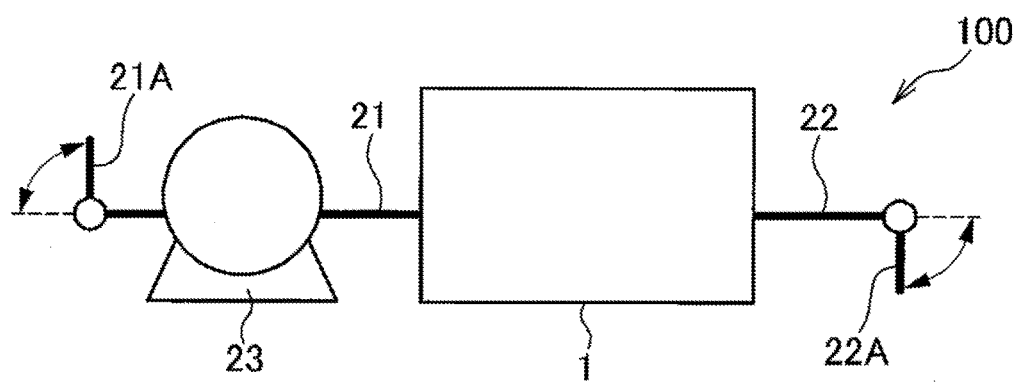
FIG. 8D illustrates a fuel cell system according to one modification.

Further, as illustrated in FIG. 8D, the fuel cell system 100 may not include the cathode pressure control valve 25 but may include an upstream end 21A at the cathode gas supply passage 21 and a downstream end 22A at the cathode gas discharge passage 22 so as to turn.

In this configuration, when restraining the introduction of external air is required, the upstream end 21A at the cathode gas supply passage 21 and the downstream end 22A at the cathode gas discharge passage 22 are turned to be displaced off from the vehicle running direction. On the other hand, to release restraining the introduction of external air, the upstream end 21A and the downstream end 22A are turned such that the cathode gas supply passage 21 and the cathode gas discharge passage 22 are linearly disposed along the vehicle running direction.

Third Embodiment

Figure 9:
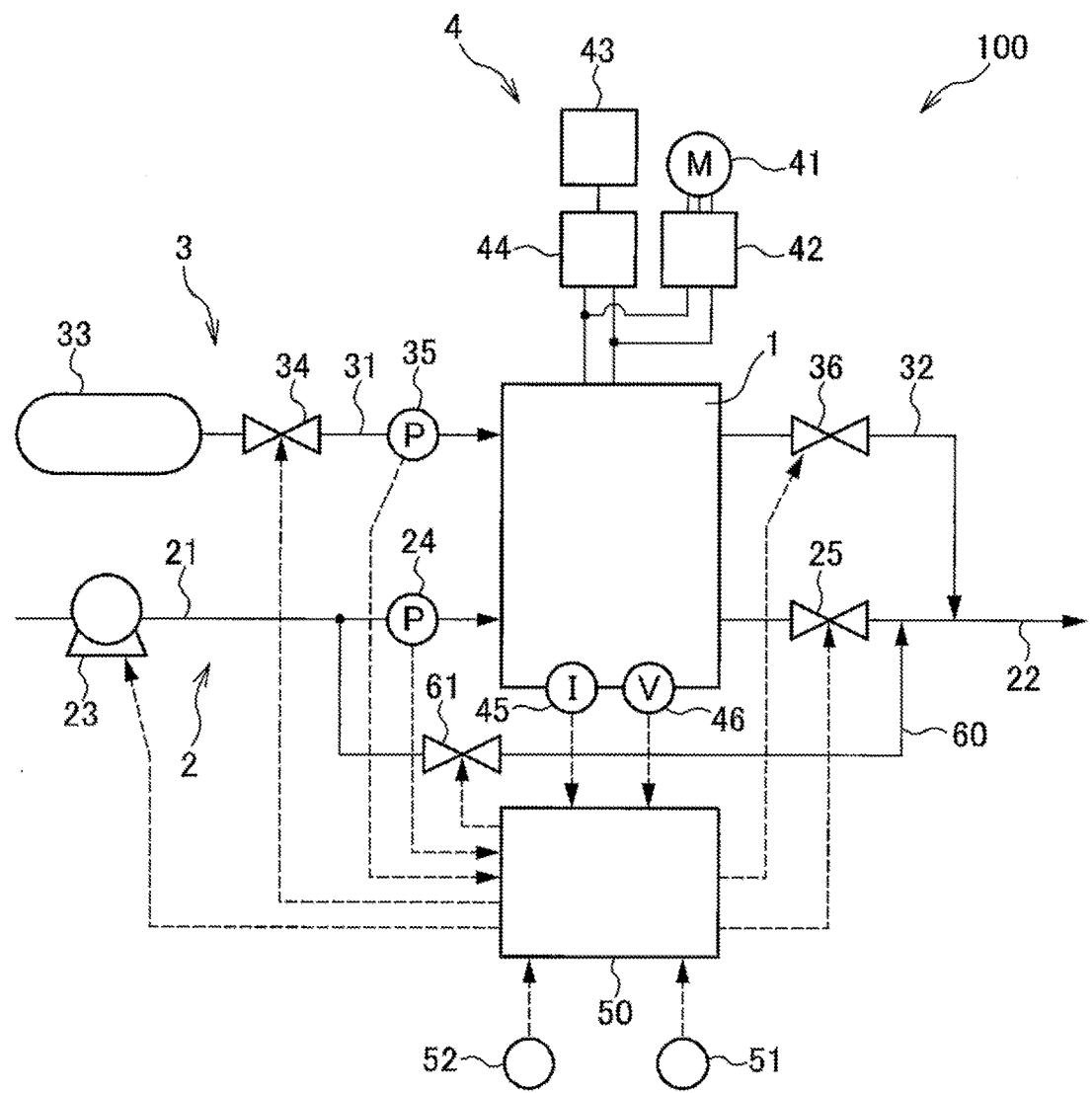
FIG. 9 is a schematic configuration diagram of a fuel cell system according to a third embodiment of the present invention.

The following describes the fuel cell system 100 according to the third embodiment of the present invention with reference to FIG. 9. The fuel cell system 100 according to the third embodiment differs from the fuel cell system according to the first embodiment in that the fuel cell system 100 includes a bypass passage 60 and a bypass valve 61.

As illustrated in FIG. 9, the fuel cell system 100 further includes the bypass passage 60, which branches from the cathode gas supply passage 21 and joins to the cathode gas discharge passage 22, and the bypass valve 61, which is disposed at the bypass passage 60.

The bypass passage 60 is a passage that bypasses this fuel cell stack 1 such that the cathode gas does not pass through the fuel cell stack 1. An upstream end of the bypass passage 60 is coupled to the cathode gas supply passage 21 upstream with respect to the cathode pressure sensor 24. A downstream end of the bypass passage 60 is coupled to the cathode gas discharge passage 22 downstream with respect to the cathode pressure control valve 25.

The bypass valve 61 is an open/close valve that opens and closes the bypass passage 60 and is disposed in the middle of the bypass passage 60. An opening degree of the bypass valve 61 is controlled by the controller 50.

Figure 10:
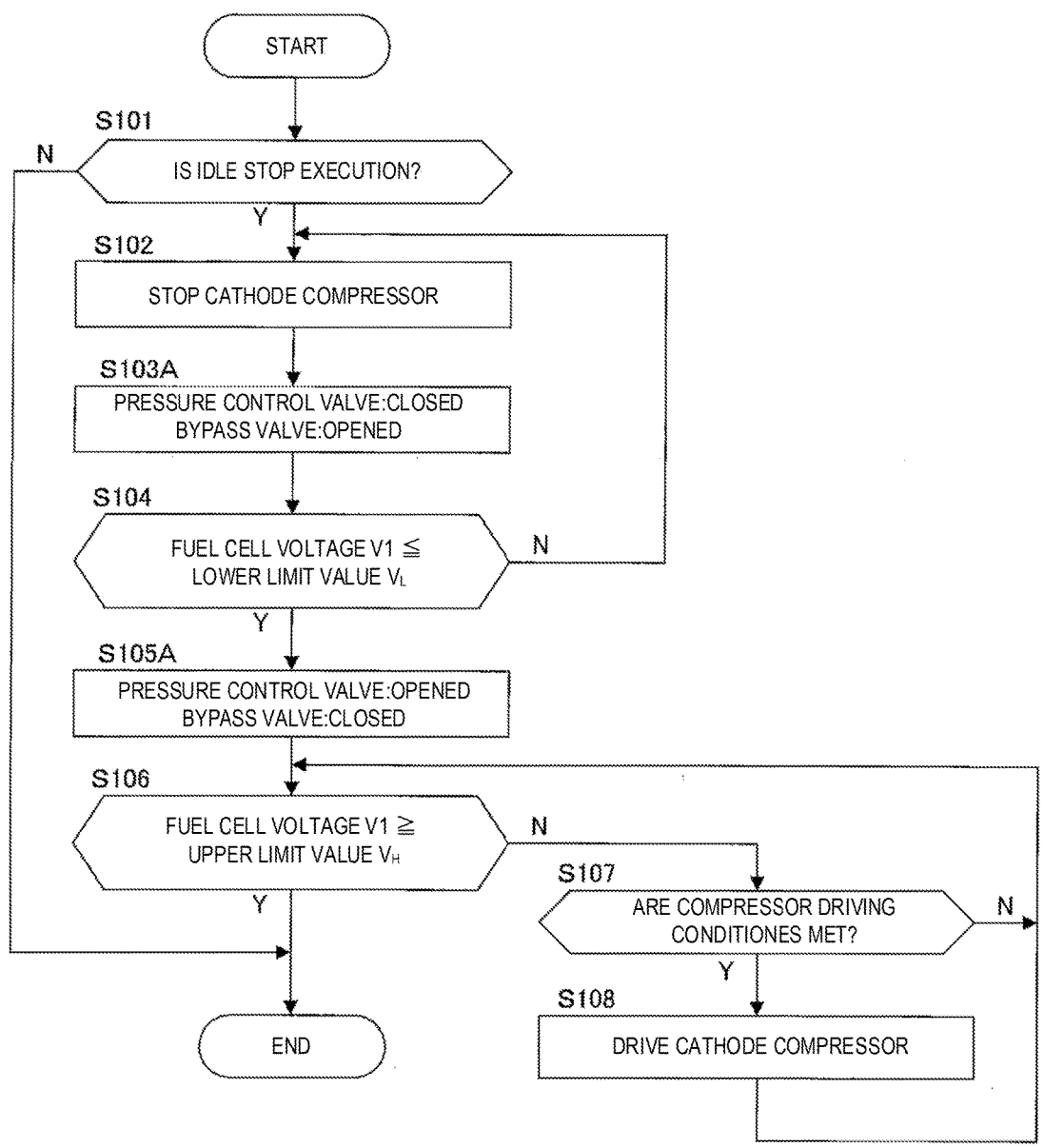
FIG. 10 is a flowchart showing the cathode supply control during idle stop executed by the controller of a fuel cell system according to the third embodiment.

With reference to FIG. 10, the following describes the cathode supply control during idle stop executed by the controller 50 in the fuel cell system 100 according to the third embodiment. The flowchart in FIG. 10 is a flowchart similar to FIG. 3. The processes at S103 and S105 in FIG. 3 are substituted by processes S103A and S105A in FIG. 10.

As illustrated in FIG. 10, at a start of idle stop, the controller 50 stops the cathode compressor 23 at S102. After the process at S102, the controller 50 executes the process at S103A.

At S103A, the controller 50 controls the cathode pressure control valve 25 so as to be the fully-closed state and controls the bypass valve 61 so as to be the fully-opened state. Thus, the controller 50 closes the cathode pressure control valve 25 and opens the bypass valve 61 during the idle stop. Therefore, even if the external air such as the running air flows into the cathode gas supply passage 21, the external air flows into the cathode gas discharge passage 22 through the bypass passage 60. This ensures restraining the unnecessary supply of the external air to the fuel cell stack 1. At S103A, opening the bypass valve 61 and then closing the cathode pressure control valve 25 is preferable.

At S104, which is a process after S103A, when the controller 50 determines that the voltage in the fuel cell stack 1 reduces up to the lower limit value $V_L$, the controller 50 executes a process at S105A.

At S105A, the controller 50 controls the cathode pressure control valve 25 from the fully-closed state to the fully-opened state and controls the bypass valve 61 from the fully-opened state to the fully-closed state. Thus opening the cathode pressure control valve 25 and closing the bypass valve 61 during the idle stop allows an all amount of the external air such as the running air flown into the cathode gas supply passage 21 to be supplied to the fuel cell stack 1. This allows the voltage in the fuel cell stack during the idle stop to be quickly increased.

At S105A, opening the cathode pressure control valve 25 and then closing the bypass valve 61 is preferable. Since a strength of the running air or similar air changes depending on the vehicle running state, the opening degree of the bypass valve 61 may be controlled based on the vehicle running state and the amount of external air introduced to the fuel cell stack 1 may be adjusted.

After the process at S105A, when the controller 50 executes the processes after S106 and the voltage in the fuel cell stack 1 reaches the upper limit value $V_H$, the cathode supply control during idle stop ends.

With the fuel cell system 100 according to the above-described embodiment, the following effects can be obtained.

With the fuel cell system 100, the controller 50 executes the stop control on the cathode compressor during the idle stop. At this time, the cathode pressure control valve 25 is closed and then the bypass valve 61 is opened. Accordingly, even if the external air such as the running air flows into the cathode gas supply passage 21, the external air flows into the cathode gas discharge passage 22 through the bypass passage 60. Therefore, the unnecessary supply of the external air to the fuel cell stack 1 can be reliably restrained, thereby ensuring preventing excessively high voltage in the fuel cell stack 1.

When the voltage in the fuel cell stack 1 during the idle stop reduces up to the lower limit value $V_L$, the controller 50 executes the valve open control on the cathode pressure control valve 25 and the valve close control on the bypass valve 61. Thus opening the cathode pressure control valve 25 and closing the bypass valve 61 during the idle stop allows the all amount of the external air such as the running air flown into the cathode gas supply passage 21 to be supplied to the fuel cell stack 1. Thus supplying the external air allows solving the insufficient cathode gas during the idle stop. Since the cathode gas is supplied without driving the cathode compressor 23, this allows saving a power consumption in the cathode compressor 23, thereby allowing enhancing the power consumption efficiency in the fuel cell system 100.

When the controller 50 executes the valve open control on the cathode pressure control valve 25 during the idle stop, the controller 50 may control the opening degree of the bypass valve 61 based on the vehicle running state and may adjust the amount of external air introduced to the fuel cell stack 1. This makes it possible to supply an appropriate amount of external air to the fuel cell stack 1.

Figure 11:
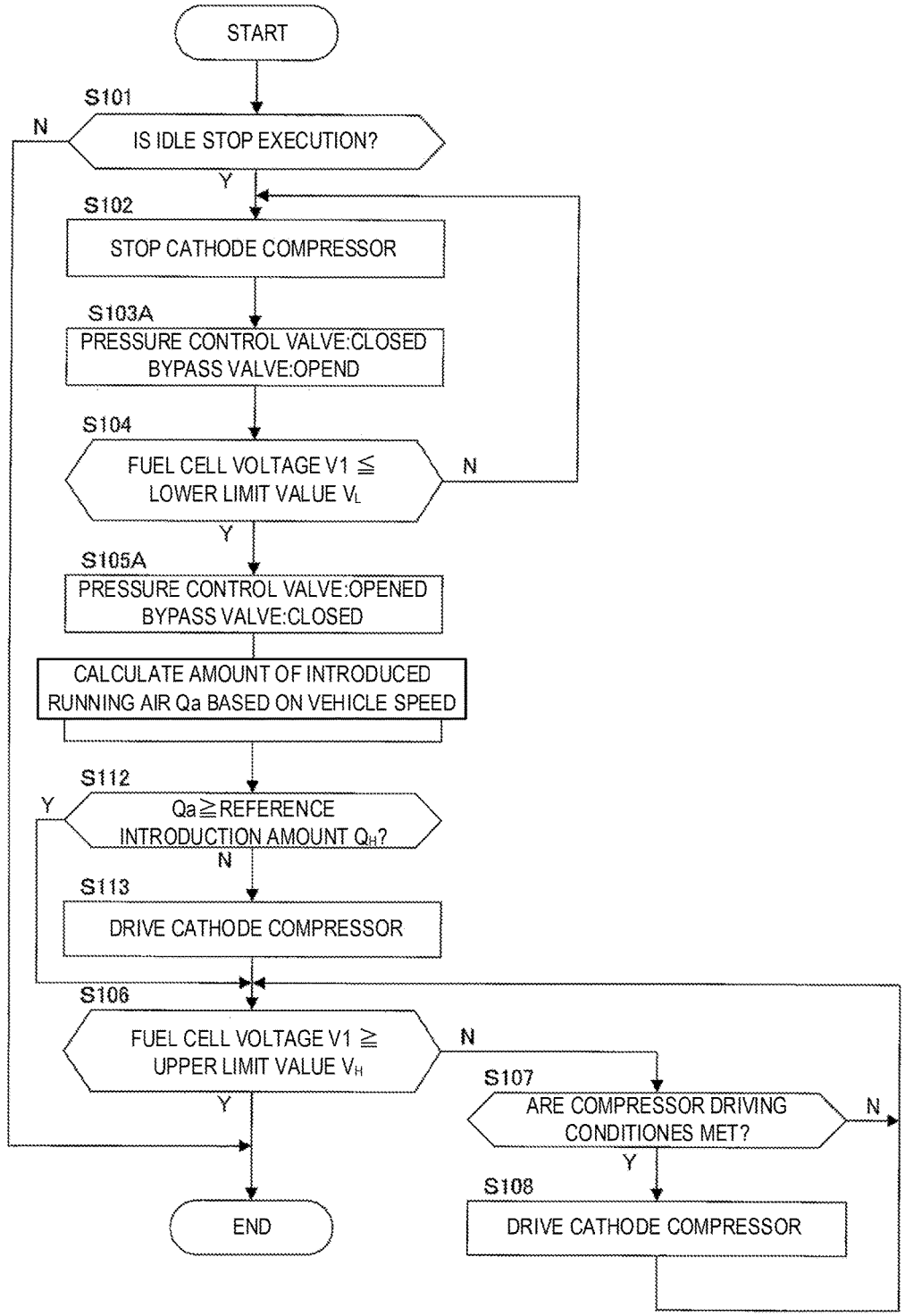
FIG. 11 is a flowchart showing the cathode supply control during idle stop executed by the controller of a fuel cell system according to a modification of the third embodiment.

The controller 50 in the fuel cell system 100 of the third embodiment may execute the cathode supply control during idle stop based on the flowchart in FIG. 11, which corresponds to the flowchart in FIG. 6 according to the second embodiment, not the flowchart in FIG. 10. The process at S103 in FIG. 6 is substituted by the process at S103A in FIG. 11, which is a process identical to S103A in FIG. 10. The process at S105 in FIG. 6 is substituted by S105A in FIG. 11, which is a process identical to S105A in FIG. 10. Thus, the execution of the cathode supply control during idle stop based on the flowchart in FIG. 11 allows obtaining the effects similar to those of the second and the third embodiments.

The embodiments of the present invention described above are merely illustration of some application examples of the present invention and not of the nature to limit the technical scope of the present invention to the specific constructions of the above embodiments.

For example, the fuel cell system 100 according to the third embodiment may not include the cathode pressure control valve 25 and may execute the external air introduction control during the idle stop only by the bypass valve 61. In this configuration, when restraining the introduction of external air is necessary during the idle stop, the bypass valve 61 is opened and to release restraining the introduction of external air, the bypass valve 61 is closed.

Furthermore, when opening the cathode pressure control valve 25 during the idle stop can take in sufficient external air, the first to the third embodiments do not drive the cathode compressor 23. However, even in this case, the cathode compressor 23 may be driven to assist taking in the external air such as the running air. This degrades the power consumption efficiency of the fuel cell system 100 by the amount of driving the cathode compressor 23; however, this makes it possible to quickly recover the voltage in the fuel cell stack 1 during the idle stop.

Furthermore, the fuel cell system 100 of the first to the third embodiments may include a blower instead of the cathode compressor 23. This blower may supply the cathode gas to the fuel cell stack 1.

The invention claimed is:

1. A fuel cell system for a vehicle with a fuel cell that generates electricity through a supply of anode gas and cathode gas, the fuel cell system comprising:
   an idle stop execution unit programmed to stop an idling of the fuel cell system according to a vehicle running state;
   a compressor control unit programmed to execute a stop control on a cathode compressor during the idle stop; and
   an external air introduction control unit programmed to restrain an introduction of external air to the fuel cell during the idle stop, wherein
   the external air introduction control unit is programmed to release restraining the introduction of external air according to a voltage in the fuel cell during the idle stop with the cathode compressor stopped.

2. The fuel cell system according to claim 1, wherein:
the external air introduction control unit is programmed to release restraining the introduction of external air when the voltage in the fuel cell reaches a lower limit value during the idle stop, and
the compressor control unit is programmed to drive the cathode compressor when the voltage in the fuel cell does not recover after the external air introduction control unit releases restraining the introduction of external air.

3. The fuel cell system according to claim 1, wherein the external air introduction control unit is programmed to restrain the introduction of external air again when the voltage in the fuel cell reaches an upper limit value after the external air introduction control unit releases restraining the introduction of external air.

4. The fuel cell system according to claim 1, further comprising
an open/close valve disposed at a cathode gas passage coupled to the fuel cell, wherein
the external air introduction control unit is programmed to close the open/close valve to restrain the introduction of external air, the external air introduction control unit being programmed to cause opening of the open/close valve to release restraining the introduction of external air.

5. The fuel cell system according to claim 1, further comprising:
a bypass passage coupled to a cathode gas passage of the fuel cell to bypass the fuel cell; and
a bypass valve disposed at the bypass passage, wherein
the external air introduction control unit is programmed to cause opening of the bypass valve to restrain the introduction of external air, the external air introduction control unit being programmed to cause closing of the bypass valve to release restraining the introduction of external air.

6. The fuel cell system according to claim 5, wherein
the external air introduction control unit is programmed to control an opening degree of the bypass valve based on the vehicle running state to release restraining the introduction of external air.

7. The fuel cell system according to claim 1, wherein
even when a driving of the cathode compressor is stopped, the cathode compressor is configured such that gas is passable through inside the compressor.

8. A method of controlling a fuel cell system for a vehicle with a fuel cell that generates electricity through a supply of anode gas and cathode gas, the method comprising:
an idle stop execution step of stopping an idling of the fuel cell system according to a vehicle running state;
a compressor control step of executing a stop control on a cathode compressor during the idle stop; and
an external air introduction control step of restraining an introduction of external air to the fuel cell during the idle stop, wherein
the external air introduction control step releases restraining the introduction of external air according to a voltage in the fuel cell during the idle stop with the cathode compressor stopped.

9. A fuel cell system that generates electricity through a supply of anode gas and cathode gas, the fuel cell system comprising:
an idle stop execution unit programmed to stop an idling of the fuel cell system according to a vehicle running state;
a compressor control unit programmed to execute a stop control on a cathode compressor during the idle stop; and
an external air introduction control unit programmed to restrain an introduction of external air to the fuel cell during the idle stop, and
an amount-of-introduced-external-air calculator programmed to calculate an amount of introduced external air to the fuel cell while the compressor stops,
wherein the external air introduction control unit is programmed to release restraining the introduction of external air according to a voltage in the fuel cell during the idle stop with the cathode compressor stopped, and
wherein the compressor control unit is programmed to drive the cathode compressor according to the amount of introduced external air calculated by the amount-of-introduced-external-air calculator when the external air introduction control unit releases restraining the introduction of external air.

\* \* \* \* \*